(12) United States Patent
Palmer et al.

(10) Patent No.: US 6,398,259 B1
(45) Date of Patent: Jun. 4, 2002

(54) BREAK-AWAY BRACKET

(75) Inventors: Timothy A. Palmer, Moon Township, PA (US); Christopher T. Korson, Rochester, MI (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/837,591

(22) Filed: Apr. 18, 2001

(51) Int. Cl.[7] .................................................. B62D 1/19
(52) U.S. Cl. ...................... 280/777; 248/200; 188/371; 188/376; 280/779; 74/492
(58) Field of Search .................................. 248/548, 300, 248/909; 280/777, 779; 74/492; 188/371, 375, 376, 377; 52/735.1

(56) References Cited

U.S. PATENT DOCUMENTS

| | | | |
|---|---|---|---|
| 3,394,613 A | * 7/1968 | Curtindale | 74/492 |
| 3,476,345 A | * 11/1969 | Ristau | 248/221 |
| 3,747,427 A | * 7/1973 | Milton et al. | 74/492 |
| 3,795,038 A | * 3/1974 | Brezinski et al. | 29/417 |
| 4,411,331 A | 10/1983 | Hanada | 180/78 |
| 4,703,669 A | 11/1987 | Hyodo | 74/492 |
| 5,190,803 A | 3/1993 | Goldbach et al. | 428/138 |
| 5,704,641 A | * 1/1998 | Shimizu et al. | 280/775 |
| 5,709,605 A | 1/1998 | Riefe et al. | 464/83 |
| 5,813,288 A | 9/1998 | Simonetti | 74/492 |
| 5,842,265 A | 12/1998 | Rink | 29/460 |
| 5,899,116 A | * 5/1999 | Armstrong et al. | 74/492 |
| 5,911,438 A | * 6/1999 | Anspaugh et al. | 280/777 |
| 5,940,949 A | 8/1999 | Rink | 29/33 K |
| 5,944,348 A | 8/1999 | Boyle, III et al. | 280/777 |
| 5,946,977 A | 9/1999 | Sato et al. | 74/492 |
| 5,975,766 A | 11/1999 | Cau | 384/538 |
| 5,979,860 A | 11/1999 | Jurik et al. | 248/548 |
| 6,027,088 A | 2/2000 | Stedman et al. | 248/200 |
| 6,099,038 A | * 8/2000 | Jurik et al. | 280/777 |
| 6,116,647 A | 9/2000 | Fischer et al. | 280/777 |
| 6,131,481 A | 10/2000 | Wilson et al. | 74/493 |
| 6,148,687 A | 11/2000 | Kurita | 74/492 |
| 6,151,982 A | 11/2000 | Matsumoto et al. | 74/493 |
| 6,152,488 A | 11/2000 | Hedderly et al. | 280/775 |
| 6,152,489 A | 11/2000 | Hedderly et al. | 280/779 |
| 6,170,874 B1 | 1/2001 | Fosse | 280/777 |

FOREIGN PATENT DOCUMENTS

EP          995668          10/1999

* cited by examiner

*Primary Examiner*—Ramon O. Ramirez
*Assistant Examiner*—Kofi Schulterbrandt
(74) *Attorney, Agent, or Firm*—Joseph C. Gil; James R. Franks

(57) ABSTRACT

Described is a break-away bracket (102) comprising a bracket shell (111) having a central channel (132) and sidewalls (120 and 123) having outwardly extending flanges (126 and 129), a clip (150 and 153) extending over at least a portion of each flange (126 and 129), and a plurality of exterior reinforcing plastic ribs (180) attached to the exterior (117) of the bracket shell (111). Each clip/flange assembly of the break-away bracket has at least one shearable pin (177), e.g., a shearable plastic pin, extending therethrough. The exterior ribs (180) are preferably formed by the molding, e.g., injection molding, of plastic material onto the exterior surfaces (117) of the bracket shell (111). The exterior ribs (180) are preferably attached to the bracket shell (111) by means of molded on plastic extending through and embedding the edges of perforations in the bracket shell. Also described is a steering column assembly comprising the break-away bracket of the present invention, and a steering column residing within the central channel of the break-away bracket.

22 Claims, 7 Drawing Sheets

BREAK-AWAY BRACKET

DESCRIPTION OF THE INVENTION

The present invention relates to a break-away bracket, e.g., a break-away steering column bracket. The break-away bracket includes a bracket shell having a central channel and sidewalls having outwardly extending flanges, a clip extending over at least a portion of each flange, and a plurality of exterior reinforcing plastic ribs attached to the exterior of the bracket shell. Each clip and flange arrangement of the break-away bracket has at least one shearable pin, e.g., a shearable plastic pin, extending therethrough.

A break-away bracket is typically used in those applications where it is desired that the bracket (and the structure that is held within the bracket) separate or break-away from the support structure to which the bracket is fastened, under certain conditions. For example, within the passenger compartment of an automobile, the steering wheel is attached to a steering shaft, which is supported within a steering column. The steering column is typically attached to a cross-car support beam by means of a bracket. If the automobile is involved in a front-end collision, it is desirable that the bracket and steering column separate or break-away from the cross-car beam and move forward, for purposes of minimizing injury to the driver resulting from impact with the steering wheel.

In, for example, the automotive industry it is desirable to minimize the weight of the vehicle in an effort towards maximizing fuel efficiency. The total weight of a vehicle can be reduced by reducing the weight of its components. However, it is generally required that the strength and rigidity of a component not be compromised as the weight of the component is reduced.

It is known that a component having a unitary molded plastic structure, formed for example by injection molding, can have reduced weight relative to an equivalent component fabricated from metal. However, unitary molded plastic parts typically have lower strength and rigidity compared to equivalent parts fabricated from metal.

It would be desirable to develop a break-away bracket that has reduced weight. It is also desirable that the break-away bracket have, in addition to reduced weight, good strength and rigidity.

U.S. Pat. No. 5,190,803 describes a lightweight structural component having high strength and rigidity, which includes a bowl-shaped shell, e.g., fabricated from metal, and injected-on plastic reinforcing ribs located within the interior of the shell. The plastic reinforcing ribs are described in the '803 patent as being connected to the shell at discrete connecting points by means of perforations in the shell through which the plastic extends and in which the edges of the perforations are embedded.

U.S. Pat. No. 6,027,088 describes a steering column support bracket, which includes a molded plastic frame having a pair of laterally spaced apart side braces, a front brace interconnecting the front ends of the side braces, and an intermediate brace located between the front and rear ends of the side braces. The steering column support bracket of the '088 patent also includes an X-shaped truss having legs extending diagonally between the side braces, and between the intermediate brace and the rear ends of the side braces.

U.S. Pat. No. 5,979,860 describes a steering column support apparatus having two capsules on either side of the steering column. The capsules of the '860 patent are described as including severable plastic ribs, which allow the steering column to collapse forwardly in a crash situation.

U.S. Pat. No. 5,944,348 describes a collapsible steering column support structure. The steering column support structure of the '348 patent includes a bracket having release capsules (e.g., fabricated from nylon) which frictionally or slidably engage the steering column to permit stroke of the steering column in the event of a frontal impact of sufficient magnitude.

In accordance with the present invention, there is provided a break-way bracket comprising:

(a) a bracket shell having interior surfaces, exterior surfaces, and two sidewalls, each sidewall having a laterally outwardly extending flange, the interior surfaces of said bracket shell defining a central channel, each flange having a plurality of perforations and a rear edge having an open ended slot;

(b) a clip extending over at least a portion of each flange, each clip having an upper plate and a lower plate, each of said upper and lower plates having a plurality of perforations, at least a portion of each flange being interposed between the upper and lower plates of each clip, and at least some of the perforations of the upper and lower plates of each clip and the perforations of the interposed portion of each flange being aligned and together defining at least one shearing pin passage for each clip and flange, the upper and lower plates of each clip each having an aperture aligned with said open ended slot of each flange which together define a fastener hole for each clip and flange;

(c) at least one shearable pin, e.g., a shearable plastic pin, extending through at least one of said shearing pin passages of each clip and flange; and (d) a plurality of exterior reinforcing ribs of plastic material in abutting relationship with and fixedly attached to at least a portion of the exterior surfaces of said bracket shell and at least a portion of at least one of said clips.

In accordance with the present invention, there is further provided a break-away bracket as described above wherein, said bracket shell has a plurality of perforations;

said exterior reinforcing ribs are formed by molding, e.g., injection molding, of plastic material onto the exterior surfaces of said bracket shell and each of said clips, a portion of the plastic material of said exterior reinforcing ribs extends through at least some of said perforations of said shell, the edges of said perforations of said bracket shell being embedded in the plastic material extending therethrough, thereby fixedly attaching said exterior reinforcing ribs to the exterior of said bracket shell; and a portion of the plastic material of said exterior reinforcing ribs extends through said shearing pin passages to form shearable plastic pins therein, the edges of said shearing pin passages being embedded in the plastic material extending therethrough, thereby anchoring said shearable plastic pins within said shearing pin passages and fixedly attaching said exterior reinforcing ribs to each clip and flange.

The features that characterize the present invention are pointed out with particularity in the claims, which are annexed to and form a part of this disclosure. These and other features of the invention, its operating advantages and the specific objects obtained by its use will be more fully understood from the following detailed description and accompanying drawings in which preferred embodiments of the invention are illustrated and described.

Unless otherwise indicated, all numbers or expressions, such as those expressing structural dimensions, quantities of ingredients, etc. used in the specification and claims are understood as modified in all instances by the term "about."

BRIEF DESCRIPTION OF THE DRAWINGS

In FIGS. 1 through 9, like reference numerals designate the same components and structural features.

DETAILED DESCRIPTION OF THE INVENTION

Figure 1:
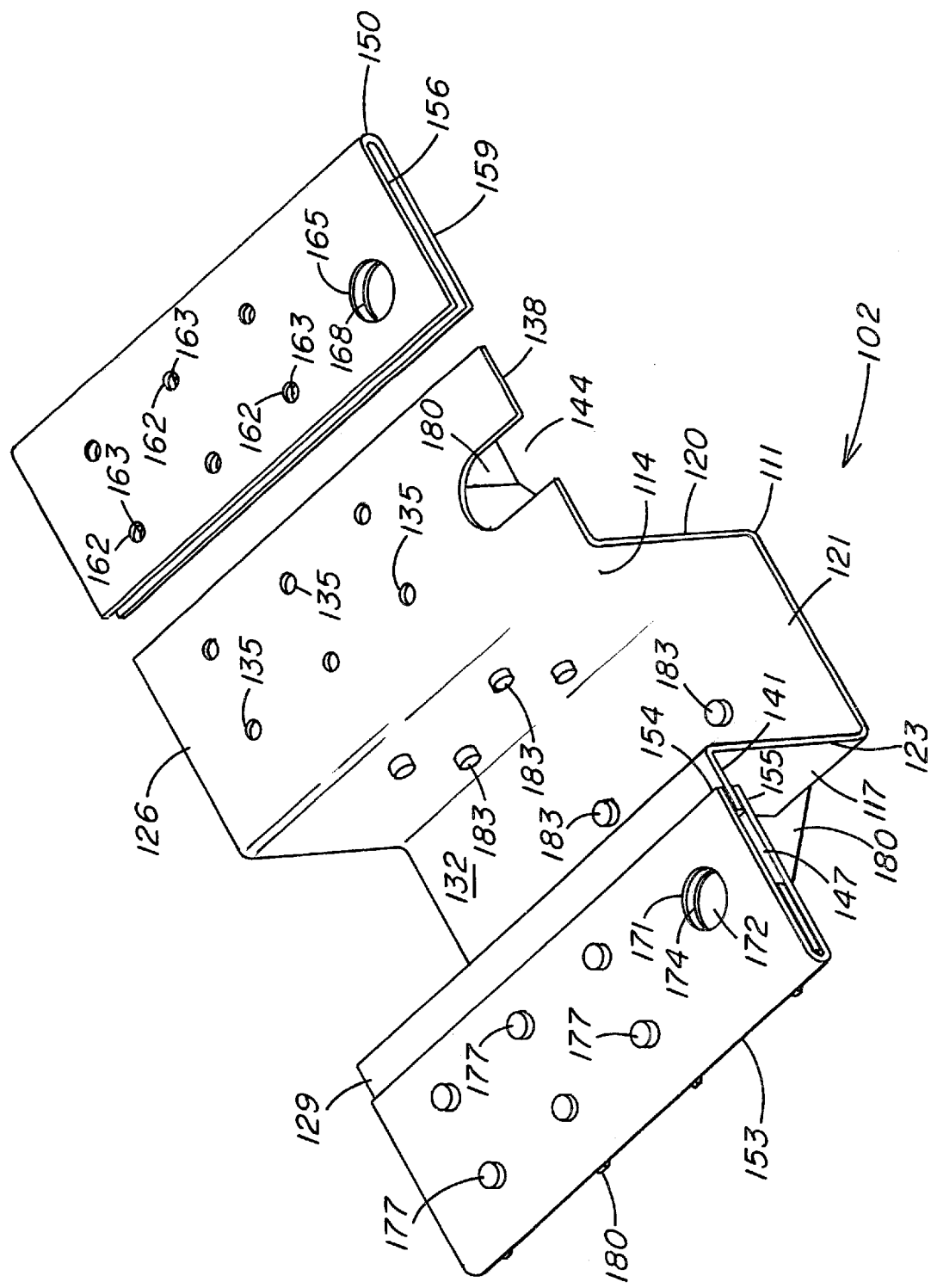
FIG. 1 is a partially exploded perspective view of a break-away bracket according to the present invention.
Figure 2:
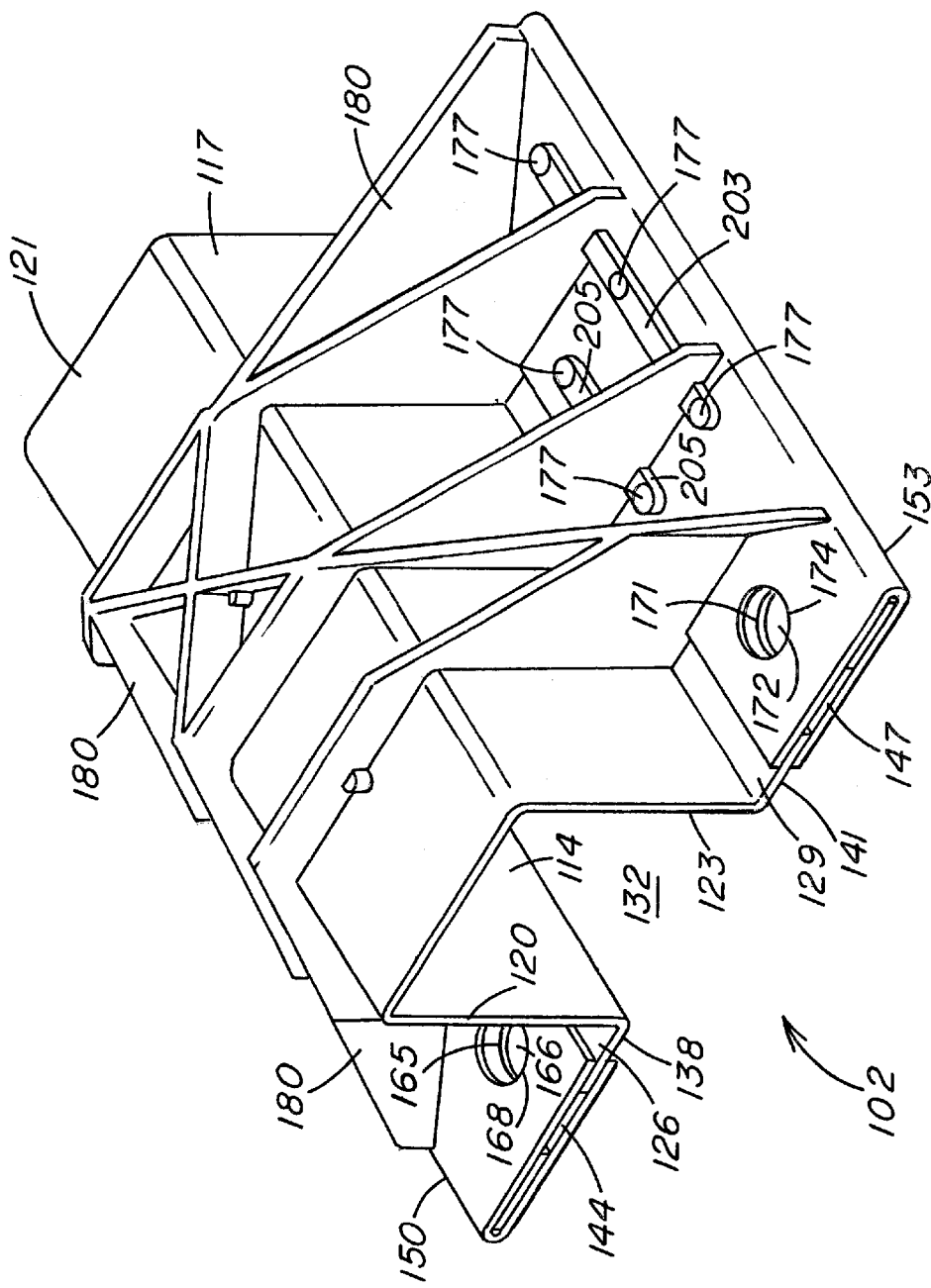
FIG. 2 is a perspective view of the break-away bracket of FIG. 1, rotated 180° around its longitudinal axis.

Referring now to FIGS. 1 and 2 of the drawings, there is shown a break-away bracket 102 comprising a bracket shell 111 having sidewalls 120 and 123, and a base 121. Sidewalls 120 and 123 are preferably substantially opposed, one from the other. Bracket shell 111 has exterior surfaces 117, and interior surfaces 114 which define a central channel 132 within the bracket shell. Sidewalls 120 and 123 each have a laterally outwardly extending flange 126 and 129, respectively. Each laterally outwardly extending flange has a plurality of perforations, as represented by perforations 135 in flange 126 (as revealed in the partially exploded portion of FIG. 1). Flanges 126 and 129 each have a rear edge 138 and 141, respectively, and an open ended slot 144 and 147, respectively. Laterally outwardly extending flanges 126 and 129 are preferably substantially parallel to each other.

Separate clips 150 and 153 extend at least partially over flanges 126 and 129, respectively. Each clip has upper and lower plates, as represented by upper plate 156 and lower plate 159 of clip 150. The lower and upper plates of each clip have a plurality of perforations therein, as represented by perforations 162 in upper plate 156, and partially viewable perforations 163 in lower plate 159 of clip 150 (as revealed in the partially exploded portion of FIG. 1). When clip 150 is slid over flange 126, a portion of flange 126 is interposed between upper plate 156 and lower plate 159, and perforations 135 in flange 126 are aligned with perforations 163 in lower plate 159 and perforations 162 in upper plate 156. The aligned perforations of the flange/clip assembly define shearing pin passages (not shown) through which at least one shearable pin, e.g., a shearable plastic pin, extends, as represented by shearable pins 177 of the flange 129/clip 153 assembly.

When clip 150 is slid over flange 126, aperture 165 in upper plate 156 and aperture 168 in lower plate 159 are aligned with the open ended slot 144 of flange 126, all of which together define a fastener hole 166. Similarly with the clip 153/flange 129 assembly, aperture 171 in upper plate 154, aperture 174 in lower plate 155, and the open ended slot 147 of flange 129 together define fastener hole 172. Fastener holes 166 and 172 are used to fix the break-away bracket to a separate support structure, as will be described in further detail herein.

Break-away bracket 102 also comprises a plurality of exterior plastic reinforcing ribs 180. Exterior plastic reinforcing ribs 180 abut and are fixedly attached to: (i) at least a portion of the exterior surfaces 117 of bracket shell 111; and (ii) at least a portion of one or more of clips 150 and 153. With regard to clips 150 and 153, exterior reinforcing ribs 180, more specifically, abut and are fixedly attached to one or more of lower plates 159 and/or 155 of clips 150 and/or 153, respectively.

The bracket shell and clips of the break-away bracket of the present invention may each be fabricated from a material selected independently from metal, thermoset plastic material, thermoplastic material and combinations thereof. In a preferred embodiment of the present invention, the bracket shell, e.g., bracket shell 111, and the clips, e.g., clips 150 and 153, are each fabricated from metal. Metals from which bracket shell 111, and clips 150 and 153 may each be independently fabricated include, but are not limited to, ferrous alloys, aluminum alloys and titanium alloys.

As used herein and in the claims the term "thermoset plastic material" means plastic materials having a three dimensional crosslinked network resulting from the formation of covalent bonds between chemically reactive groups, e.g., active hydrogen groups and free isocyanate groups. Thermoset plastic materials from which bracket shell 111, and clips 150 and 153 may each be independently fabricated include those known to the skilled artisan, e.g., crosslinked polyurethanes, crosslinked polyepoxides and crosslinked polyesters. Of the thermoset plastic materials, crosslinked polyurethanes are preferred. Shell 111, and clips 150 and 153 may each be independently fabricated from crosslinked polyurethanes by the art-recognized process of reaction injection molding. Reaction injection molding typically involves, as is known to the skilled artisan, injecting separately, and preferably simultaneously, into a mold: (i) an active hydrogen functional component (e.g., a polyol and/or polyamine); and (ii) an isocyanate functional component (e.g., a diisocyanate such as toluene diisocyanate, and/or dimers and trimers of a diisocyanate such as toluene diisocyanate). The filled mold may optionally be heated to ensure and/or hasten complete reaction of the injected components. Upon complete reaction of the injected components, the mold is opened and the molded article (e.g., bracket shell 111, or clips 150 and 153) is removed.

As used herein and in the claims, the term "thermoplastic material" means a plastic material that has a softening or melting point, and is substantially free of a three dimensional crosslinked network resulting from the formation of covalent bonds between chemically reactive groups, e.g., active hydrogen groups and free isocyanate groups. Examples of thermoplastic materials from which bracket shell 111, and clips 150 and 153 may each be independently fabricated include, but are not limited to, thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polypropylene, thermoplastic acrylonitrile-butadiene-styrene and mixtures or thermoplastic compositions containing one or more thereof. Of the thermoplastic materials from which bracket shell 111, and clips 150 and 153 may each be independently fabricated, thermoplastic polyamides are preferred. Bracket shell 111, and clips 150 and 153 may each be independently fabricated from thermoplastic materials by the art-recognized process of injection molding, in which a molten stream of thermoplastic material, e.g., molten thermoplastic polyamide, is injected into a mold, e.g., an optionally heated mold. Upon cooling the filled mold, the molded article (e.g., bracket shell 111, or clips 150 and 153) is removed. A preferred thermoplastic material from which bracket shell 111, and clips 150 and 153 may each be independently fabricated is thermoplastic polyamide, e.g., DURETHAN thermoplastic polyamide, commercially available from Bayer Corporation.

The thermoset plastic materials and/or thermoplastic materials from which bracket shell 111, and clips 150 and 153 may each be independently fabricated, may optionally be reinforced with a material selected from glass fibers, carbon fibers, boron fibers metal fibers and mixtures thereof. The reinforcing fibers, and the glass fibers in particular, may have sizings on their surfaces to improve miscibility and/or adhesion to the plastics into which they are incorporated, as is known to the skilled artisan. Glass fibers are a preferred reinforcing material in the present invention. If used, the reinforcement material, e.g., glass fibers, is typically present in the thermoset plastic materials and/or thermoplastic materials of bracket shell 111, and/or clips 150 and 153 in a reinforcing amount, e.g., in an amount of from 5 percent by weight to 60 percent by weight, based on the total weight of the respective plastic component.

The material from which the shearable pins of the break-away bracket of the present invention are fabricated may be selected from, for example, plastic materials (e.g., thermoset plastic materials and/or thermoplastic materials), metals (e.g., embrittled metals), silica based glass, ceramic materials and combinations thereof. In a preferred embodiment of the present invention, the shearable pins of the break-away bracket are shearable plastic pins, e.g., shearable thermoplastic pins.

The plastic material of exterior reinforcing ribs 180 and shearable plastic pins 177 of break-away bracket 102 may be selected independently from thermoset plastic materials, thermoplastic materials and combinations thereof. The thermoset plastic materials from which exterior reinforcing ribs 180 and shearable plastic pins 177 may each be independently fabricated include those described previously herein, e.g., crosslinked polyurethanes. In a preferred embodiment of the present invention, the plastic of exterior reinforcing ribs 180 and shearable plastic pins 177 is a thermoplastic material selected independently from thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polypropylene, thermoplastic acrylonitrile-butadiene-styrene and mixtures or thermoplastic compositions containing one or more thereof. A preferred thermoplastic material from which exterior reinforcing ribs 180 and shearable plastic pins 177 may each be independently fabricated is thermoplastic polyamide, e.g., DURETHAN thermoplastic polyamide, commercially available from Bayer Corporation. In a preferred embodiment of the present invention, exterior reinforcing ribs 180 and shearable plastic pins 177 are fabricated from the same thermoplastic material, e.g., the same thermoplastic polyamide.

Exterior plastic reinforcing ribs 180 and shearable plastic pins 177 of break-away bracket 102 may optionally be reinforced with a material selected from glass fibers, carbon fibers, boron fibers, metal fibers and mixtures thereof. The reinforcing fibers, as described previously herein, may be surface treated, e.g., with sizings, prior to incorporation into the plastic material of the reinforcing ribs and/or the shearable plastic pins. A preferred reinforcing material for use in the exterior reinforcing ribs and/or the shearable plastic pins of the present invention are glass fibers. If used, the reinforcement material, e.g., glass fibers, is typically present in the thermoset plastic materials and/or thermoplastic materials of exterior reinforcing ribs 180 and/or shearable plastic pins 177 in a reinforcing amount, e.g., in an amount of from 5 percent by weight to 60 percent by weight, based on the total weight of the respective plastic component.

The plastic materials of bracket shell 111, exterior reinforcing ribs 180, clips 150 and 153, and shearable plastic pins 177 may each independently further contain one or more functional additives other than or in addition to reinforcing materials. Additives that may be present in the plastic material of the bracket shell, exterior reinforcing ribs, clips and shearable plastic pins of the break-away bracket include, but are not limited to, antioxidants, colorants, e.g., pigments and/or dyes, mold release agents, fillers, e.g., calcium carbonate, ultraviolet light absorbers, fire retardants and mixtures thereof. Additives may be present in the plastic material of the bracket shell, exterior reinforcing ribs, clips and shearable plastic pins in functionally sufficient amounts, e.g., in amounts independently from 0.1 percent by weight to 10 percent by weight, based on the total weight of the respective plastic component.

The exterior reinforcing ribs of the break-away bracket are prepared by the art recognized processes of reaction injection molding (in the case of thermoset plastic materials), and injection molding (in the case of thermoplastic materials, as described previously herein. In a preferred embodiment of the present invention, exterior reinforcing ribs 180 form a continuous unitary structure on the exterior surface 117 of bracket shell 111, and clips 150 and 153. Exterior reinforcing ribs 180 having a continuous unitary structure are typically formed in a single mold. Exterior reinforcing ribs 180 may be molded into a continuous unitary structure, which is then attached to exterior surfaces 117 of bracket shell 111, and clips 150 and/or 153. Alternatively, exterior reinforcing ribs 180 may be formed into a continuous unitary structure by injection molding of plastic material directly onto exterior surfaces 117 of bracket shell 111, and clips 150 and/or 153, as will be described in further detail herein.

The shearable pins 177 may be fabricated, e.g., molded, separately from exterior reinforcing ribs 180 and inserted into the shearing pin passages of the clip/flange assemblies. The shearable pins may be held within the shearing pin passages by means of, for example, adhesives. Alternatively, at least a portion of the shearable pins may be threaded, thus allowing for the pins to be tightly screwed into the shearing pin passages. In a preferred embodiment of the present invention, the shearable pins are shearable plastic pins, which are continuous with the exterior reinforcing ribs that abut the clips. When continuous with the exterior reinforcing ribs, the shearable plastic pins are typically formed concurrently with the mold formation of the exterior reinforcing ribs, and may optionally further serve to fixedly attach or anchor the exterior ribs to the clip/flange assemblies.

Exterior reinforcing ribs 180 may be fixedly attached to bracket shell 111, and one or more of the clip (150, 153)/ flange (126, 129) assemblies by attachment means selected from fasteners, adhesives, snap connections and combinations thereof. Examples of fasteners that may be used in the present invention include, but are not limited to, screws, e.g., sheet metal screws, nuts and bolts, and metal rivets. Adhesives that may be used include those that are known to the skilled artisan, e.g., epoxy resin based adhesives. Snap connections are typically formed by pushing the enlarged rounded head of a cylindrical extension (not shown), extending from exterior reinforcing ribs 180, through a matched flexible perforation in bracket shell 111 (not shown). The rounded head of the cylindrical extension has a diameter greater than that of the matched perforation, and the cylindrical shaft of the extension has a diameter that is typically equivalent to the diameter of the perforation. Upon pushing the enlarged rounded head of the extension through the matched perforation, the perforation closes back around the shaft of the extension, thus fixedly attaching exterior reinforcing ribs 180 to bracket shell 111.

In a particularly preferred embodiment of the present invention, the bracket shell of the break-away bracket has a plurality of perforations having edges. Exterior reinforcing ribs 180 are preferably formed by molding, e.g., injection molding, of plastic material onto the exterior surfaces 117 of bracket shell 111, and a portion of the plastic material of exterior reinforcing ribs 180 extends through at least some of the perforations of bracket shell 111 (as represented by attachment heads 183 in FIG. 1). The edges of the perforations are embedded in the plastic material extending therethrough, thereby fixedly attaching exterior reinforcing ribs 180 to bracket shell 111.

Sectional representations of attachment points or elements formed by the passage of injected on plastic through perforations in bracket shell 111 are depicted in FIGS. 6–9. Attachment element 3 of FIG. 6 comprises exterior reinforcing rib 180 which abuts exterior surface 117 of sidewall 120 of bracket shell 111. A portion of the abutting plastic material of exterior rib 180 extends through perforation 80 of sidewall 120, is continuous with attachment head 183, and embeds edge portions 83 of perforation 80 in the plastic material extending therethrough. Perforations 80 of sidewall 120 may have any desired configuration, e.g., round, square, rectangular, ellipsoid or slotted.

At least some of the perforations in the bracket shell, flanges and/or clips, and optionally the shearing pin passages of the break-away bracket may have deformed edge portions, which are embedded in the plastic material extending therethrough, in an embodiment of the present invention. The deformed edge portions of the perforations may be formed during or after formation of the perforation. When, for example, the bracket shell is fabricated from plastic materials, the deformed edges of the perforations may be formed during molding of the bracket shell. When the bracket shell is fabricated from metal, the deformed edges of the perforations are typically formed by means of metal fabricating techniques, such as metal punches, as is known to the skilled artisan.

Figure 8:
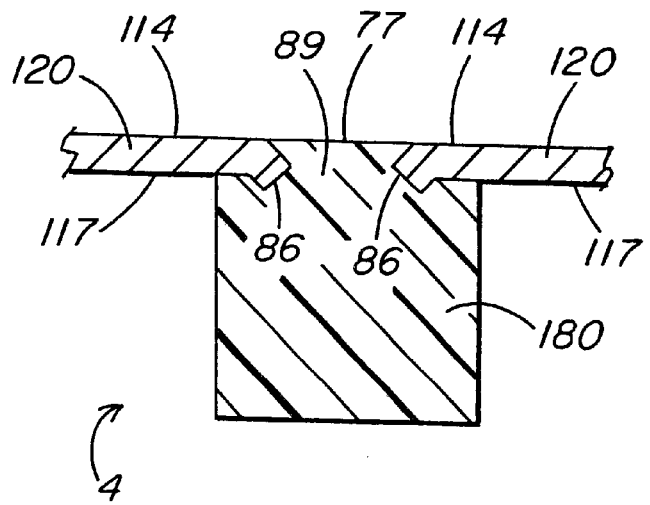
FIG. 8 is a sectional representation of deformed perforation edges embedded in the plastic material extending therethrough.

Referring to FIG. 8, attachment element 4 comprises a portion of exterior reinforcing rib 180 abutting exterior surface 117 of sidewall 120 of bracket shell 111. A portion of the plastic material of exterior reinforcing rib 180 extends through perforation 89 of sidewall 120 and is continuous with attachment head 77 (not shown in the FIGS. 1–5, and which is substantially flush with the exterior surface 117 of sidewall 120). Perforation 89 has deformed edge portions 86, which are embedded in the plastic material extending therethrough. The deformed edge portions 86 of perforation 89 are directed outward towards the exterior of bracket shell 111. Perforations having deformed edge portions, such as perforation 89, may have any desired configuration, e.g., round, square, rectangular, ellipsoid or slotted.

Figure 9:
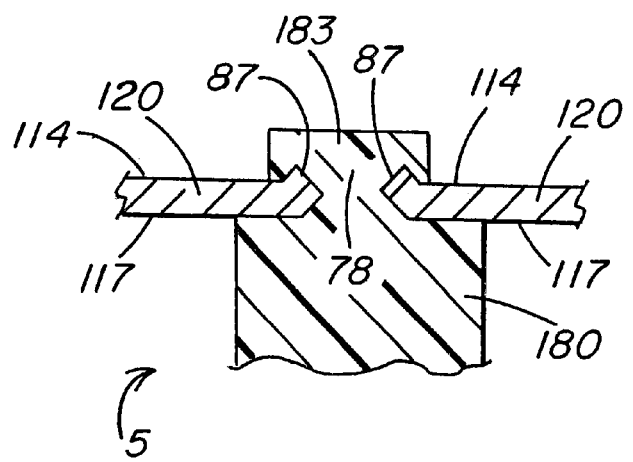
FIG. 9 is a sectional representation of deformed perforation edges embedded in the plastic material extending therethrough.

Attachment element 5 of FIG. 9 comprises a portion of exterior reinforcing rib 180 abutting exterior surface 117 of sidewall 120 of bracket shell 111. A portion of the plastic material of exterior reinforcing rib 180 extends through perforation 78 of sidewall 120, and is continuous with attachment head 183. Perforation 78 has deformed edge portions 87, which are embedded in the plastic material extending therethrough. The deformed edge portions 87 of perforation 78 are directed inward, towards the central channel 132 of bracket shell 111.

Figure 7:
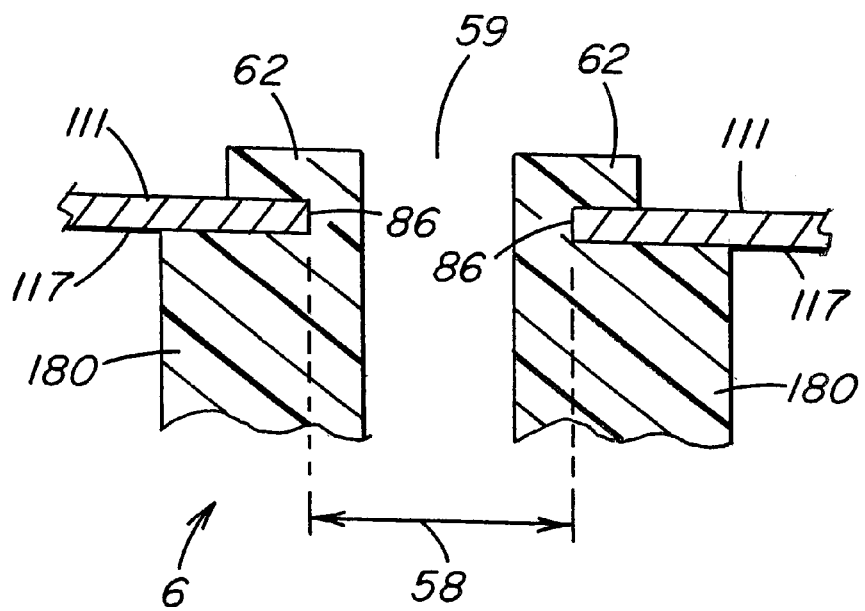
FIG. 7 is a sectional representation of plastic embedded perforation edges in which the plastic material defines a substantially plastic lined aperture.

In an embodiment of the present invention, the plastic material extending through the perforations and embedding the edges of the perforations, also defines a substantially plastic lined aperture in the bracket shell of the break-away bracket. The plastic lined aperture may be of any desired shape, e.g., circular, ellipsoid, square, rectangular or slotted. With reference to FIG. 7, attachment element 6 comprises exterior reinforced ribs 180 which extend through original aperture 58 in bracket shell 111 and are continuous with open attachment head 62. Original aperture 58 has edge portions 86 that are embedded in the plastic material extending therethrough. The plastic material extending through original aperture 58 defines plastic lined aperture 59. Plastic lined apertures are not shown in break-away bracket 102 of FIGS. 1–5.

The process of injecting thermoplastic material, or reaction injection of thermoset plastic material onto the clips and exterior surfaces of the bracket shell of the break-away bracket involves using the bracket shell and clips as a portion of the mold in which the exterior reinforcing ribs are formed. Plastic materials that are molded onto the interior and/or onto the exterior surfaces of the bracket shell and clips are referred to herein and in the claims as "molded on plastic materials" and similar terms.

With reference to FIGS. 1 and 2, clips 150 and 153 are slid over flanges 126 and 129, such that the perforations in the flanges and the clips are aligned to define the shearing pin passages, and fastener holes 166 and 172. Bracket shell 111, with clips 150 and 153 positioned aligningly over flanges 126 and 129, is typically inserted into a first mold portion (not shown). The exterior surfaces 117 of bracket shell 111, the clip surfaces, and the interior surfaces of the first mold portion together define a continuous cavity into which plastic material, e.g., molten thermoplastic material, is injected to form exterior reinforcing ribs 180 and shearable plastic pins 177. Optionally, second mold portions (not shown) may be placed in abutting relationship with the interior surfaces 114 and over the perforations in bracket shell 111 to form and define attachment heads 183. Further optionally, third mold portions (not shown) may be placed over the shearing pin passages, e.g., on upper plate 154 of clip 153, to form and define those portions of shearable plastic pins 177 which may optionally extend beyond the upper plate of the clip.

The concurrent formation of the exterior ribs and shearable plastic pins by injection molding of plastic material onto the exterior surfaces and clips of the bracket shell, is a preferred method of making the shearable plastic pins continuous with the exterior ribs. The shearable plastic pins may extend directly out of the exterior ribs through the shearing pin passages of the clip/flange assemblies, and/or from plastic extensions that are continuous with the exterior plastic ribs. With reference to FIG. 2, five of the six shearable plastic pins 177, of the clip 153/flange 129 assembly, extend from plastic extensions 203 and 205, which are continuous with exterior reinforcing ribs 180. One of the six shearable plastic pins 177, of the clip 153/flange 129 assembly, extends directly from exterior reinforcing ribs 180 (not shown). As described previously herein, when continuous with the exterior ribs, the shearable plastic pins can further serve to fixedly attach or anchor the exterior ribs to the clips, and more specifically to the clip/flange assemblies.

In an embodiment of the present invention, at least a portion of the interior and/or exterior surfaces of the bracket shell of the break-away bracket are covered with a layer of molded on plastic material, e.g., a thermoset plastic material and/or a thermoplastic material, preferably a thermoplastic material, such as thermoplastic polyamide. A covering of molded on plastic material can serve to protect the bracket shell, for example, from corrosion, in the case when the bracket shell is fabricated from metal.

When the exterior reinforcing ribs are fixedly attached to the bracket shell and clips of the break-away bracket by means of molded on plastic extending through perforations in the bracket shell and clips, additional attachment means may optionally be used. Such additional optional attachment means may be selected from fasteners, adhesives, snap connections and combinations thereof (as described previously herein).

Figure 3:
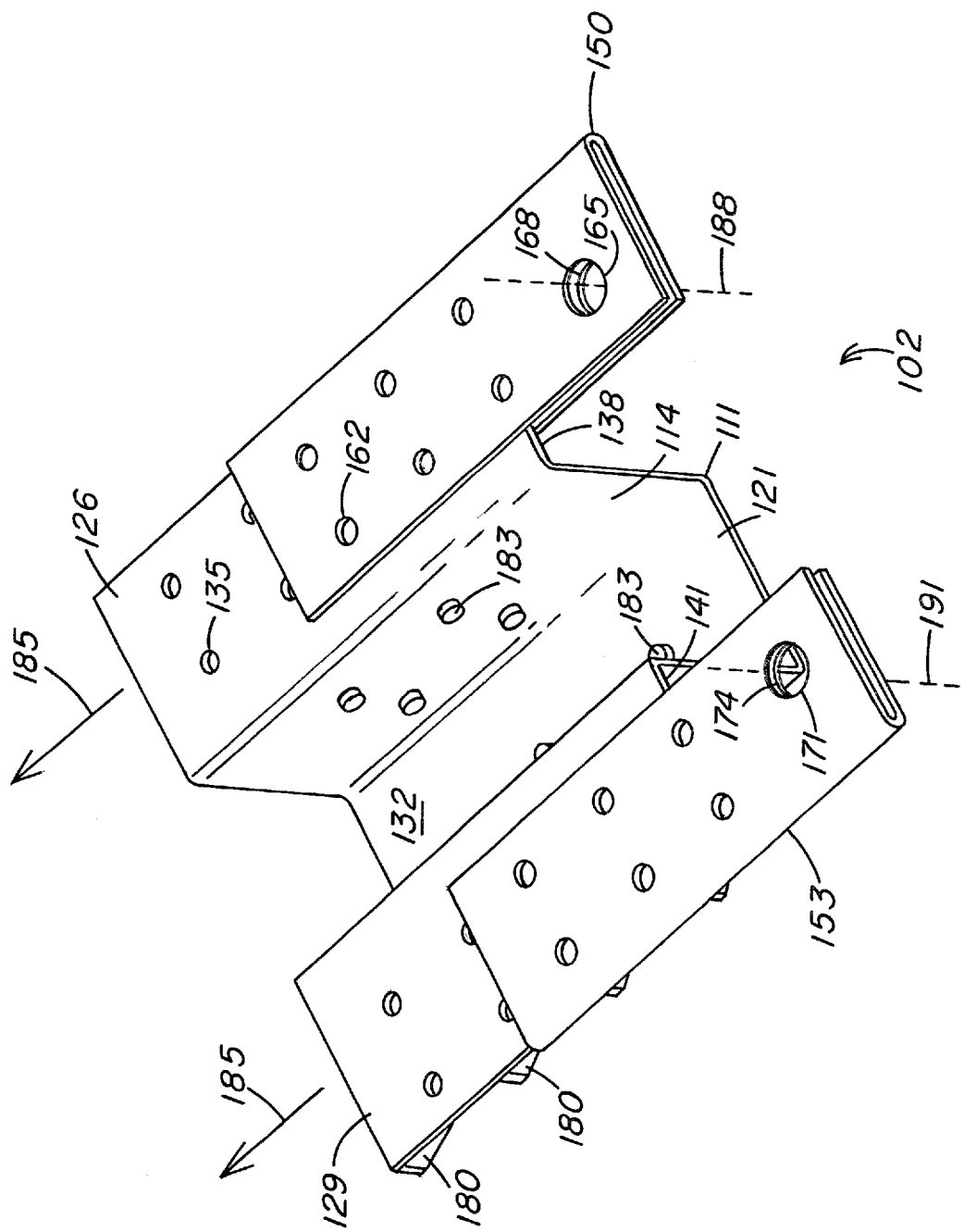
FIG. 3 is a perspective view of the break-away bracket of FIG. 1 undergoing a break-away event.

The break-away action of the bracket according to the present invention can be described with reference to FIG. 3. A break-away event typically results from a sudden or nearly instantaneous deceleration of the structure or vehicle in which the break-away bracket is mounted, e.g., as would occur in a crash, such as a front-end automotive collision. In a break-away event, clips 150 and 153 are retained in their original position by fasteners, e.g., bolts, passing through clip apertures 168, 165, 174 and 171, as represented by dashed lines 188 and 191. The shearable pins (not shown in FIG. 3) are sheared, and the bracket shell 111, along with exterior ribs 180 and any structures held within channel 132 (e.g., a steering column) continues to move forward in the direction of travel, as indicated by arrows 185.

In accordance with the present invention, there is provided a steering column assembly comprising:
 (a) the break-away bracket of the present invention, as described previously herein; and
 (b) a steering column supporting rotatably a rotatable steering shaft passing through the steering column, a portion of the steering column resides within the central channel of the break-away bracket and is attached to the break-away bracket;
wherein the break-away bracket is attached to a support structure by means of a fastener passing through each of the fastener holes of the bracket, the support structure being separate from the break-away bracket and the steering column.

Figure 4:
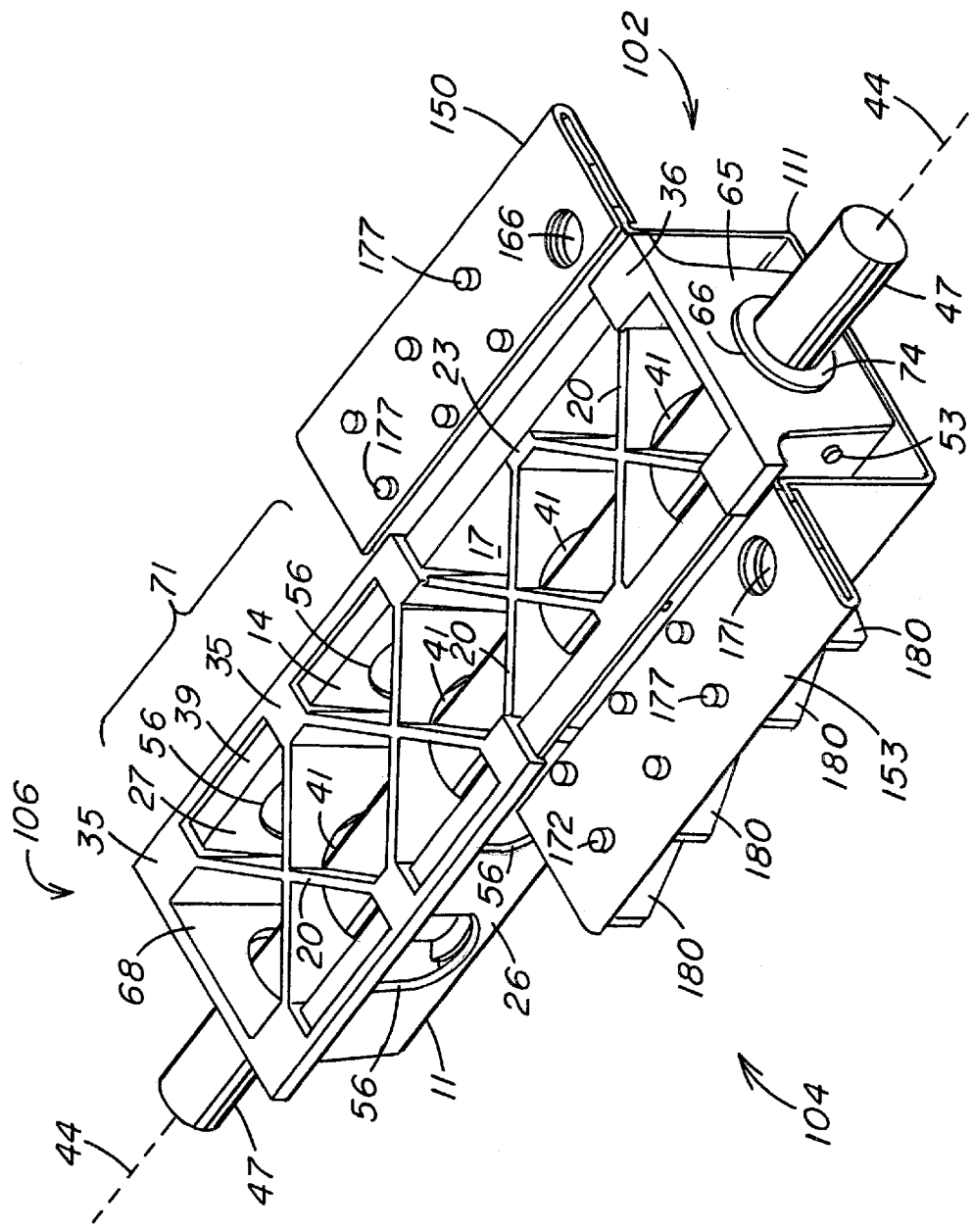
FIG. 4 is a perspective view of a steering column assembly according to the present invention.
Figure 5:
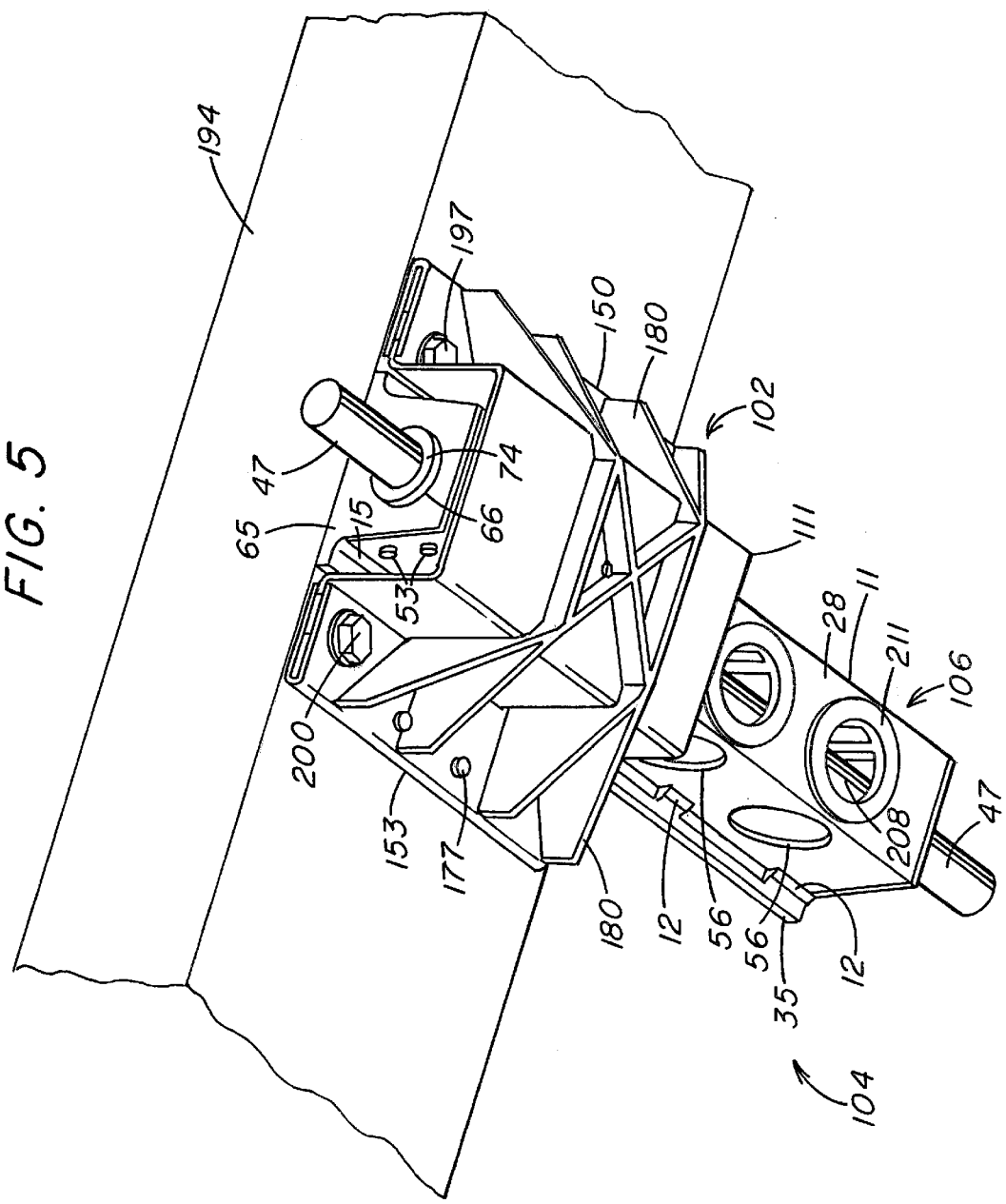
FIG. 5 is a perspective view of the steering column assembly of FIG. 4, fixed to a support structure.
Figure 6:
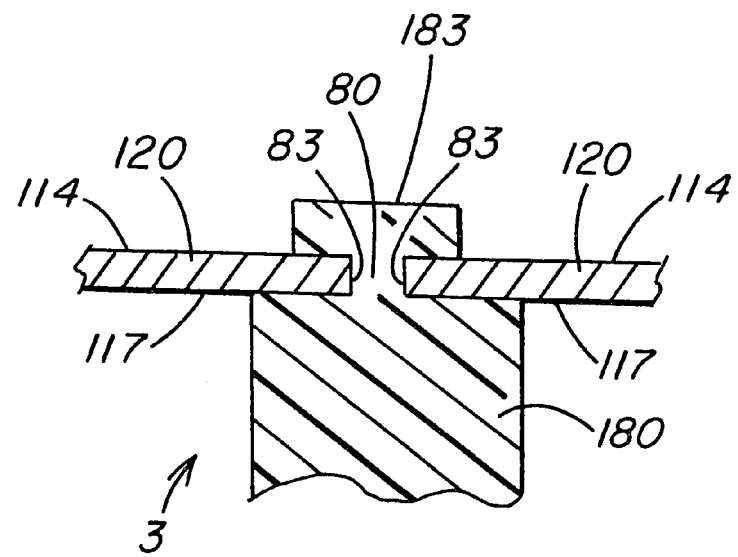
FIG. 6 is a sectional representation of perforation edges embedded in the plastic material extending therethrough.

With reference to FIGS. 4 and 5, there is shown a steering column assembly 104, which comprises break-away bracket 102 and steering column 106. Steering column 106 may be attached to and held within channel 132 of break-away bracket 102 by art-recognized attachment means, e.g., by means of one or more bolts (not shown). Steering column assembly 104 is attached to cross car beam 194 by means of bolts 197 and 200, which pass through fastener holes 166 and 172 of break-away bracket 102.

In a preferred embodiment of the present invention, the steering column of the steering column assembly comprises:

(i) an elongated shell having interior surfaces which define a hollow interior; and (ii) a plurality of interior reinforcing ribs of plastic material located within the hollow interior of the elongated shell. At least a portion of the interior reinforcing ribs are in abutting relationship with the interior surfaces of the elongated shell, and the interior reinforcing ribs define a longitudinal passage through the elongated shell for receiving and supporting rotatably the rotatable steering shaft. The interior reinforcing ribs are fixedly attached to the elongated shell. The interior reinforcing ribs, while fixedly attached to the elongated shell, are not continuous with the elongated shell(i.e., the interior reinforcing ribs and elongated shell of the steering column are separate structures).

With further reference to FIGS. 4 and 5 of the drawings, steering column 106 includes an elongated shell 11 having substantially opposing sidewalls 26 and 27, and base 28. Elongated shell 11 has interior surfaces 14 which define a hollow interior 17. More specifically, it is the interior surfaces of sidewalls 26, 27 and base 28 that define hollow interior 17. A plurality of reinforcing ribs 20 are located within the hollow interior 17 of elongated shell 11. A portion 23 of interior reinforcing ribs 20 abuts interior surfaces 14 of elongated shell 11 (i.e., interior reinforcing ribs 20 are not continuous with shell 11). Interior reinforcing ribs 20 define a longitudinal passage 41, having a longitudinal axis 44, through interior 17 of elongated shell 11.

Steering column 106 also includes a first plastic reinforcing end plate 65 having an aperture 66 therein, and a second plastic reinforcing end plate 68 having an aperture 67 therein. Apertures 66 and 67 are substantially axially aligned with and serve to further define longitudinal passage 41. End plates 65 and 68 are substantially opposed one from the other, and at least a portion of each abuts interior surfaces 14 of elongated shell 11.

A rotatable shaft 47 is received in longitudinal passage 41. Shaft 47 may be rotatably supported within longitudinal passage 41 by at least one of: (i) the interior reinforcing ribs 20; (ii) bushings, e.g., plastic bushings, (not shown); and (iii) rolling bearing means. Aperture 66 of first end plate 65 has rolling bearing means 74 therein, which rotatably supports shaft 47. Steering column 106 may include additional rolling bearing means 74, e.g., within longitudinal passage 41 and aperture 67 of second end plate 68. Rolling bearing means that may be used in the present invention include those that are known to the skilled artisan, and typically include a housing, e.g., a plastic housing, and metal ball bearings (not shown) which engage rotatably with shaft 47.

Elongated shell 11 of steering column 106 may be fabricated from materials selected from metal, thermoset plastic material, thermoplastic material and combinations thereof. In a preferred embodiment of the present invention, elongated shell 11 is fabricated from metal. Metals from which elongated shell 11 may be fabricated include, but are not limited to, ferrous alloys, aluminum alloys and titanium alloys. The thermoset and thermoplastic materials from which elongated shell 11 may be fabricated include those described and recited previously herein.

The plastic material of interior reinforcing ribs 20 of steering column 106 may be selected from thermoset plastic materials, thermoplastic materials and combinations thereof. The thermoset and thermoplastic materials from which interior reinforcing ribs 20 may be fabricated include those described and recited previously herein. Preferably, interior reinforcing ribs 20 are fabricated from thermoplastic materials, e.g., thermoplastic polyamide.

The plastic of interior plastic reinforcing ribs 20 and elongated shell 11 of steering column 106 may optionally be reinforced with a material selected from glass fibers, carbon fibers, boron fibers, metal fibers and mixtures thereof. A preferred reinforcing material for use in the interior reinforcing ribs of the steering column are glass fibers. If used, the reinforcement material, e.g., glass fibers, is typically present in the thermoset plastic materials and/or thermoplastic materials of interior ribs 20 and/or elongated shell 11 in a reinforcing amount, e.g., in an amount of from 5 percent by weight to 60 percent by weight, based on the total weight of the respective plastic component.

The plastic materials of shell 11 and interior reinforcing ribs 20 may each independently further contain one or more functional additives other than or in addition to reinforcing materials. Additives that may be present in the plastic material of the elongated shell and/or the interior reinforcing ribs of the steering column include, but are not limited to, antioxidants, colorants, e.g., pigments and/or dyes, mold release agents, fillers, e.g., calcium carbonate, ultraviolet light absorbers, fire retardants and mixtures thereof. Additives may be present in the plastic material of the elongated shell and/or the interior reinforcing ribs in functionally sufficient amounts, e.g., in amounts independently from 0.1 percent by weight to 10 percent by weight, based on the total weight of the respective plastic component.

The interior reinforcing ribs of the steering column are prepared by the art recognized processes of reaction injection molding (in the case of thermoset plastic materials), and injection molding (in the case of thermoplastic materials, as described previously herein. In a preferred embodiment of the present invention, interior reinforcing ribs 20 form a continuous unitary structure within the hollow interior 17 of elongated shell 11. Interior reinforcing ribs 20 having a continuous unitary structure are typically formed in a single mold. Interior reinforcing ribs 20 may be molded into a continuous unitary structure which is then inserted into hollow interior 17 and attached to elongated shell 11. Alternatively, and preferably, interior reinforcing ribs 20 may be formed into a continuous unitary structure by injection molding of plastic material directly onto interior surfaces 14 of elongated shell 11, in accordance with the injection molded on plastic processes as described previously herein. In a particularly preferred embodiment of the present invention, interior reinforcing ribs 20 with first reinforcing end plate 65 and second reinforcing end plate 68 together form a continuous unitary structure within the hollow interior 17 of shell 11.

Interior reinforcing ribs 20 may be fixedly attached to elongated shell 11 by attachment means selected from fasteners, adhesives, snap connections and combinations thereof. Examples of fasteners, adhesives and snap connections include those as described previously herein.

In a particularly preferred embodiment of the present invention, the elongated shell 11 of the steering column 106 has a plurality of perforations having edges. Interior reinforcing ribs 20 are preferably formed by molding, e.g., injection molding, of plastic material onto the interior surfaces 14 of elongated shell 11, and a portion of the plastic material of interior reinforcing ribs 20 extends through at least some of the perforations of elongated shell 11 (as represented by attachment heads 53 in FIGS. 4 and 5). The edges of the perforations are embedded in the plastic material extending therethrough, thereby fixedly attaching interior reinforcing ribs 20 to elongated shell 11. The plastic embedded perforation edges of steering column 106 may optionally be deformed edges, as described previously here with regard to the deformed perforation edges of break-away bracket 102.

The plastic embedded perforation edges of steering column 106, may be described in a manner similar to the plastic embedded perforation edges of break-away bracket 102, as recited previously herein. For example, with reference to FIGS. 6, 8 and 9. Rather than injection molding of plastic material onto exterior 117 of bracket shell 111, plastic material is injected onto interior surface 14 of elongated shell 11, which extends from interior ribs 20 through perforations in elongated shell 11 to attachment heads 53 on the exterior of elongated shell 11.

In an embodiment of the present invention, the plastic material 211 extending through the perforations and embedding the edges of the perforations of elongated shell 11, also defines a substantially plastic lined aperture 208 in the elongated shell 11 of the steering column 106 (see FIG. 5). The plastic lined aperture 208 of steering column 106 can be described similarly as with the description of the plastic lined apertures of the break-away bracket, e.g., as described with reference to FIG. 7 previously herein.

In a further embodiment of the present invention, a portion of the exterior surface of elongated shell 11 of the steering column 106 is covered with exterior molded on plastic material that is continuous with interior reinforcing ribs 20, and which serves to further fixedly attach the interior ribs to the elongated shell (in addition to the molded on plastic material extending through perforations in the elongated shell). With further reference to FIGS. 4 and 5, sidewalls 26 and 27 of elongated shell 11 each have laterally outwardly extending flanges 32 and 29, respectively. Plastic material extends over and around each of flanges 29 and 32 (as represented by attachment elements 35 and 36 in FIGS. 4 and 5). The plastic material of attachment elements 35 and 36 is continuous with interior reinforcing ribs 20, end plate 65 and end plate 68, and serves to further fixedly attach interior reinforcing ribs 20 along with reinforcing end plates 65 and 68 to elongated shell 11. With further reference to FIG. 5, attachment elements 35 and 36 wrap around flange 29 and abut the exterior of sidewall 27 by means of abutting foot portions 12 and 15, respectively.

When the interior reinforcing ribs are fixedly attached to the elongated shell of the steering column by means of molded on plastic extending through perforations in the elongated shell, additional attachment means may optionally be used. Such additional optional attachment means may be selected from fasteners, adhesives, snap connections and combinations thereof (as described previously herein).

At least a portion of the steering column may optionally be irreversibly longitudinally collapsible. This is particularly desirable when the steering column is used in an automobile. In the event that the automobile sustains a front end collision, it is preferred that the steering column collapse irreversibly forward along its longitudinal axis, to minimize impact between the steering wheel and the driver. The collapsible portion of the steering column may, for example, include at least one of the following: thinner shell wall sections; slotted or perforated shell wall sections; reticulated or accordion-like shell wall sections; thinner plastic reinforcing ribs; and plastic reinforcing ribs that do not contain reinforcing materials, such as glass fibers.

Steering column 102 of FIGS. 4 and 5 has an irreversibly longitudinally collapsible section 71. Collapsible portion 71 includes large apertures 56 in sidewalls 26 and 27 of elongated shell 11. The large apertures 56 in sidewalls 26 and 27 serve to allow steering column 102 to irreversibly collapse along its longitudinal axis 44, in response to a severe impact directed substantially along axis 44.

The present invention has been described with reference to specific details of particular embodiments thereof. It is not intended that such details be regarded as limitations upon the scope of the invention except insofar as and to the extent that they are include in the accompanying claims.

What is claimed is:

1. A break-away bracket comprising:
   (a) a bracket shell having interior surfaces, exterior surfaces, and two sidewalls, each sidewall having a laterally outwardly extending flange, the interior surfaces of said bracket shell defining a central channel, each flange having a plurality of perforations and a rear edge having an open ended slot;
   (b) a U-shaped clip extending over at least a portion of each flange, each clip having an upper plate and a lower plate, each of said upper and lower plates having a plurality of perforations, at least a portion of each flange being interposed between the upper and lower plates of each clip, and at least some of the perforations of the upper and lower plates of each clip and the perforations of the interposed portion of each flange being aligned and together defining at least one shearing pin passage for each clip and flange, the upper and lower plates of each clip each having an aperture aligned with said open ended slot of each flange which together define a fastener hole for each clip and flange;
   (c) at least one shearable pin extending through at least one of said shearing pin passages of each clip and flange; and
   (d) a plurality of exterior reinforcing ribs of plastic material in abutting relationship with and breakaway-ably attached to fixedly attached to at least a portion of the exterior surfaces of said bracket shell and at least a portion of at least one of said clips.

2. The break-away bracket of claim 1 wherein said bracket shell and said clips are each fabricated from a material selected independently from metal, thermoset plastic material, thermoplastic material and combinations thereof.

3. The break-away bracket of claim 2 wherein said bracket shell and said clips are each fabricated from metal.

4. The break-away bracket of claim 1 wherein said shearable is a shearable plastic pin.

5. The break-away bracket of claim 4 wherein the plastic material of said exterior reinforcing ribs and the plastic material of said shearable plastic pins are each independently selected from thermoset plastic materials, thermoplastic materials and combinations thereof.

6. The break-away bracket of claim 5 wherein the plastic material of each of said exterior reinforcing ribs and said shearable plastic pins is a thermoplastic material selected independently from thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polypropylene, thermoplastic acrylonitrile-butadiene-styrene and thermoplastic compositions containing one or more thereof.

7. The break-away bracket of claim 4 wherein the plastic material of each of said exterior reinforcing ribs and said shearable plastic pins is reinforced with a material selected independently from glass fibers, carbon fibers, boron fibers, metal fibers and mixtures thereof.

8. The break-away bracket of claim 1 wherein said exterior reinforcing ribs are fixedly attached to the exterior of said shell and to at least one of said clips by attachment means selected independently from fasteners, adhesives, snap connections and combinations thereof.

9. The break-away bracket of claim 1 wherein said exterior reinforcing ribs form a continuous unitary structure on the exterior of said bracket shell and said clips.

10. The break-away bracket of claim 4 wherein said shearable plastic pins are continuous with said exterior reinforcing ribs abutting each of said clips.

11. The break-away bracket of claim 1 wherein said sidewalls are substantially opposing sidewalls.

12. The break-away bracket of claim 10 wherein said laterally outwardly extending flanges are substantially parallel to each other.

13. The break-away bracket of claim 4 wherein,
    said bracket shell has a plurality of perforations;
    said exterior reinforcing ribs are formed by molding of plastic material onto the exterior surfaces of said bracket shell and each of said clips, a portion of the plastic material of said exterior reinforcing ribs extends through at least some of said perforations of said bracket shell, the edges of said perforations of said bracket shell being embedded in the plastic material extending therethrough, thereby fixedly attaching said exterior reinforcing ribs to the exterior of said bracket shell; and
    a portion of the plastic material of said exterior reinforcing ribs extends through said shearing pin passages to form said shearable plastic pins, the edges of said shearing pin passages being embedded in the plastic material extending therethrough, thereby anchoring said shearable plastic pins within said shearing pin passages and fixedly attaching said exterior reinforcing ribs to each clip and flange.

14. The break-away bracket of claim 13 wherein at least some of said perforations of said bracket shell and said shearing pin passages each independently have deformed edge portions, and said deformed edge portions are embedded in the plastic material extending therethrough.

15. The break-away bracket of claim 13 wherein the plastic material extending through and embedding said edges of said perforations defines substantially plastic lined apertures in said bracket shell.

16. The break-away bracket of claim 13 wherein at east a portion of at least one of the interior surfaces and exterior surfaces of said bracket shell are covered with a layer of molded on plastic material.

17. The break-away bracket of claim 13 wherein said exterior reinforcing ribs are further fixedly attached to said bracket shell and to each of said clips by attachment means selected independently from fasteners, adhesives, snap connections and combinations thereof.

18. A steering column assembly comprising:
    (a) the break-away bracket of claim 1 or claim 13; and
    (b) a steering column supporting rotatably a rotatable steering shaft passing through said steering column, a portion of said steering column residing within the central channel of said break-away bracket and being attached to said break-away bracket;
    wherein said break-away bracket is attached to a support structure by means of a fastener passing through each of said fastener holes, said support structure being separate from said break-away bracket and said steering column.

19. The steering column assembly of claim 18 wherein said support structure is a cross-car beam.

20. The steering column assembly of claim 18 wherein said steering column comprises:
   (i) an elongated shell having interior surfaces which define a hollow interior; and
   (ii) a plurality of interior reinforcing ribs of plastic material located within the hollow interior of said elongated shell, at least a portion of said interior reinforcing ribs being in abutting relationship with the interior surfaces of said elongated shell, said interior reinforcing ribs defining a longitudinal passage through said elongated shell for receiving and supporting rotatably said rotatable steering shaft, and said interior reinforcing ribs being fixedly attached to said elongated shell.

21. The steering column assembly of claim 20 wherein said interior reinforcing ribs are fixedly attached to said elongated shell by attachment means selected from fasteners, adhesives, snap connections and combinations thereof.

22. The steering column assembly of claim 20 wherein,
   said elongated shell has a plurality of perforations; and
   said interior reinforcing ribs are formed by molding of plastic material onto the interior surfaces of said elongated shell, and a portion of the plastic material of said interior reinforcing ribs extends through at least some of said perforations of said elongated shell, the edges of said perforations being embedded in the plastic material extending therethrough, thereby attaching fixedly said interior reinforcing ribs to said elongated shell.

* * * * *

UNITED STATES PATENT AND TRADEMARK OFFICE
CERTIFICATE OF CORRECTION

PATENT NO. : 6,398,259 B1
DATED : April 18, 2001
INVENTOR(S) : Timothy A. Palmer et al.

It is certified that error appears in the above-identified patent and that said Letters Patent is hereby corrected as shown below:

<u>Column 13,</u>
Lines 1-32, please amend Claim 1 as follows.
1. (Currently Amended) A break-away bracket comprising:
    (a) a bracket shell having interior surfaces, exterior surfaces, and two sidewalls, each sidewall having a laterally outwardly extending flange, the interior surfaces of said bracket shell defining a central channel, each flange having a plurality of perforations and a rear edge having an open ended slot;
    (b) a U-shaped clip extending over at least a portion of each flange, each clip having an upper plate and a lower plate, each of said upper and lower plates having a plurality of perforations, at least a portion of each flange being interposed between the upper and lower plates of each clip, and at least some of the perforations of the upper and lower plates of each clip and the perforations of the interposed portion of each flange being aligned and together defining at least one shearing pin passage for each clip and flange, the upper and lower plates of each clip each having an aperture aligned with said open ended slot of each flange which together define a fastener hole for each clip and flange;
    (c) at least one shearable pin extending through at least one of said shearing pin passages of each clip and flange; and ,
    (d) a plurality of exterior reinforcing ribs of plastic material in abutting relationship with and fixedly attached to at least a portion of the exterior surfaces of said bracket shell and breakawayably attached to at least a portion of at least one of said clips.

Signed and Sealed this

Twentieth Day of July, 2004

JON W. DUDAS
*Acting Director of the United States Patent and Trademark Office*